UNITED STATES PATENT OFFICE.

FREDERICK A. LUTTERS, OF NEW YORK, N. Y.

MELLOWING COMPOUND FOR LIQUORS.

1,037,783. Specification of Letters Patent. Patented Sept. 3, 1912.

No Drawing. Application filed December 28, 1911. Serial No. 668,217.

*To all whom it may concern:*

Be it known that I, FREDERICK A. LUTTERS, a citizen of the United States, and resident of the city of New York, borough of Brooklyn, county of Kings, and State of New York, have invented certain new and useful Improvements in Mellowing Compound for Liquors, of which the following is a specification.

This invention relates to a mellowing compound adapted to be used in the smoothening, softening or mellowing of whisky, brandy, gin, wine or other liquors and also to the process of making a compound.

In its preferred form the compound consists of St. Johns bread or wild locust, preferably the imported variety grown in Sicily, with fruit, alcohol and syrup. The preferred proportions of the several ingredients and method of making a compound adapted for general uses for the purpose set out are as follows: 100 lbs. of St. Johns bread, 50 lbs. of figs and 50 lbs. of raisins are ground or chopped and mixed in a receptacle with 25 gallons of 190 proof alcohol, known as high proof spirits. This mixture is allowed to stand for about one week when 12 gallons of pure rock candy syrup dissolved in 18 gallons of pure or distilled water is added. 30 gallons of pure rock candy syrup alone may be added instead of the syrup and water, if desired. The mixture so made is then allowed to stand for at least two or three months, the same being stirred at intervals to insure a complete mixing of the ingredients. The undissolved fruit pulp finally settles to the bottom of the receptacle and the liquid is then drawn off from the top of the pulp. The fruit pulp is then removed and pressed to extract the liquid or juices contained therein and this is then mixed with the liquid first drawn off. The compound may then be further sweetened, if desired, by the addition of more of the rock candy syrup after which it is filtered by any suitable means to remove any sediment. If a more concentrated product is desired the compound may be boiled or distilled and is then ready to be used in the manufacture of liquor for mellowing or softening the same.

Any fruit may be used to give the desired result or flavor. For instance, dry or fresh peaches, preferably of the North Carolina or Georgia variety, may be substituted for either the figs or raisins, or peaches may be used instead of the St. Johns bread together with either the figs or raisins or with both. Imported fruit is preferable although the domestic can be used. This compound can also be used in connection with the manufacture of cough medicines and other medicinal products.

What I claim is:

1. A compound for mellowing liquors, consisting of St. Johns bread, fruit, alcohol and syrup.

2. A compound for mellowing liquors, consisting of St. Johns bread, figs, raisins, alcohol and syrup.

3. A compound for mellowing liquors, consisting of St. Johns bread, fruit, alcohol and rock candy syrup.

4. A compound for mellowing liquors, consisting of 100 lbs. of St. Johns bread, 50 lbs. of figs, 50 lbs. of raisins, 25 gallons of high proof alcohol, 12 gallons of pure rock candy syrup and 18 gallons of distilled water.

5. The process of making a compound for mellowing liquors, consisting in grinding and mixing St. Johns bread, figs and raisins, placing the same in a receptacle and adding a quantity of high proof alcohol, allowing the mixture to stand for some time, then adding rock candy syrup, stirring at intervals while allowing to stand for some time, drawing off the liquid from the top and pressing the fruit pulp to obtain the liquid therefrom, and mixing all of the liquid so obtained.

6. The process of making a compound for mellowing liquors, consisting in grinding and mixing St. Johns bread, figs and raisins, placing the same in a receptacle and adding a quantity of high proof alcohol, allowing the mixture to stand for some time, then adding rock candy syrup, stirring at intervals while allowing to stand for some time, drawing off the liquid from the top and pressing the fruit pulp to obtain the liquid therefrom, and mixing and concentrating all of the liquid so obtained by boiling or distilling.

Signed at New York city, in the county of New York and State of New York, this 23rd day of December, 1911.

FREDERICK A. LUTTERS.

Witnesses:
B. W. COULDOCK,
L. J. DOOLITTLE.